US005790132A

United States Patent [19]
Watson

[11] Patent Number: 5,790,132
[45] Date of Patent: Aug. 4, 1998

[54] IMAGE RENDERING SYSTEM WITH EXTENSIBLE MECHANISM FOR PROVIDING VISUAL USER FEEDBACK WHEN AN IMAGE GRAPHIC IS SELECTED

[75] Inventor: Ralph T. Watson, Cupertino, Calif.

[73] Assignee: Object Technology Licensing Corp., Cupertino, Calif.

[21] Appl. No.: 568,855

[22] Filed: Dec. 7, 1995

[51] Int. Cl.$^6$ ............................................. G06T 11/00
[52] U.S. Cl. ........................................................ 345/441
[58] Field of Search .................................. 395/141, 133, 395/326, 348, 349

[56] References Cited

U.S. PATENT DOCUMENTS

| | | | |
|---|---|---|---|
| 4,821,220 | 4/1989 | Duisberg | 364/578 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,847 | 12/1991 | Fromme | 395/700 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas et al. | 395/650 |
| 5,133,075 | 7/1992 | Risch | 395/800 |
| 5,151,987 | 9/1992 | Abraham et al. | 395/575 |
| 5,181,162 | 1/1993 | Smith et al. | 364/419 |
| 5,297,284 | 3/1994 | Jones et al. | 395/700 |
| 5,315,703 | 5/1994 | Matheny et al. | 395/164 |
| 5,317,741 | 5/1994 | Schwanke | 395/700 |
| 5,325,533 | 6/1994 | McInerney et al. | 395/700 |
| 5,327,562 | 7/1994 | Adcock | 395/700 |
| 5,339,430 | 8/1994 | Lundin et al. | 395/700 |
| 5,339,438 | 8/1994 | Conner et al. | 395/700 |
| 5,421,016 | 5/1995 | Conner et al. | 395/700 |
| 5,423,023 | 6/1995 | Batch et al. | 395/500 |
| 5,428,721 | 6/1995 | Sato et al. | 395/133 |
| 5,428,792 | 6/1995 | Conner et al. | 395/700 |
| 5,432,925 | 7/1995 | Abraham et al. | 395/500 |
| 5,437,027 | 7/1995 | Bannon et al. | 395/600 |

FOREIGN PATENT DOCUMENTS

WOA9512161  5/1995  WIPO.

OTHER PUBLICATIONS

Dumas, Joseph and Paige Parsons. "Discovering the Way Programmers Think: New Programming Environments." *Communications of the ACM*. June 1995: pp. 45–56.

Pascoe, Geoffrey A. "Encapsulators: A New Software Paradigm in Smalltalk-80." *OOPSLA '86 Proceedings*. Sep. 1986: pp. 341–346.

Purtilo, James M. and Joanne M. Atlee. "Module Reuse by Interface Adaption." *Software—Practice and Experience*. Jun. 1991: pp. 539–556.

Lam, Siman S. "Protocol Conversion." *IEEE Transactions on Software Engineering*. Mar. 1988: pp. 353–362.

Thatte, Satish R. "Automated Synthesis of Interface Adapters for Reuseable Classes." *POPL '94*. Jan. 1994: pp. 174–187.

Yellin, Daniel M. and Robert E. Strom. "Interfaces, Protocols, and the Semi–Automatic Construction of Software Adaptors." *OOPSLA '94*. Oct. 1994: pp. 176–190.

(List continued on next page.)

*Primary Examiner*—Almis R. Jankus
*Attorney, Agent, or Firm*—Kudirka & Jobse

[57] ABSTRACT

Computer software, process, and object-oriented objects that decouple the details of accessing graphical data from the details of processing and iterating through the graphical data. The invention first receives a filter routine and a funnel routine, and passes an iterator, that enumerates over the graphical data, to the funnel routine. Then the invention repetitively calls both the filter and funnel routines to enumerate over the graphical data. The filter routine selects, orders and returns graphical data. The funnel routine processes the graphical data and also can pre-terminate enumeration. Developers have the capability extend the invention by providing their own versions of the filter and funnel routines and by modifying the enumeration.

32 Claims, 13 Drawing Sheets

OTHER PUBLICATIONS

Jacobson, Ivar and Fredrik Lindstrom. "Re-engineering of old systems to an object-oriented architecture." *OOPSLA '91*. pp. 340-350.

Filman, Robert E. "Retrofitting Objects." *OOPSLA '87*. Oct. 1987: pp. 342-353.

Dietrich, Walter C., Lee R. Nackman and Franklin Gracer. "Saving a Legacy with Objects." *OOPSLA '89*. Oct. 1989: 77-83.

Dotts, Alan and Don Birkley. "Development of Reuseable Test Equipment Software Using Smalltalk and C." *OOPSLA '92*. Oct. 1992: pp. 31-35.

Duntemann, Jeff and Chris Marinacci. "New Objects for Old Structures." *Byte*. Apr. 1990: pp. 261-266.

Alabiso, Bruno. "Transformation of Data Flow Analysis Models to Object-Oriented Design." *OOPSLA '88*. Sep. 1988: pp. 335-353.

Madhavji, Nazim H., Jules Desharnais, Luc Pinsonneault, and Kamel Toubache. "Adapting Modules to an Integrated Programming Environment." *IEEE International Conference on Programming Languages*. 1988: pp. 364-371.

Dutt, Nikil D. "Legend: A Language for Generic Component Library Description." *IEEE International Conference on Computer Languages*. 1990: 198-207.

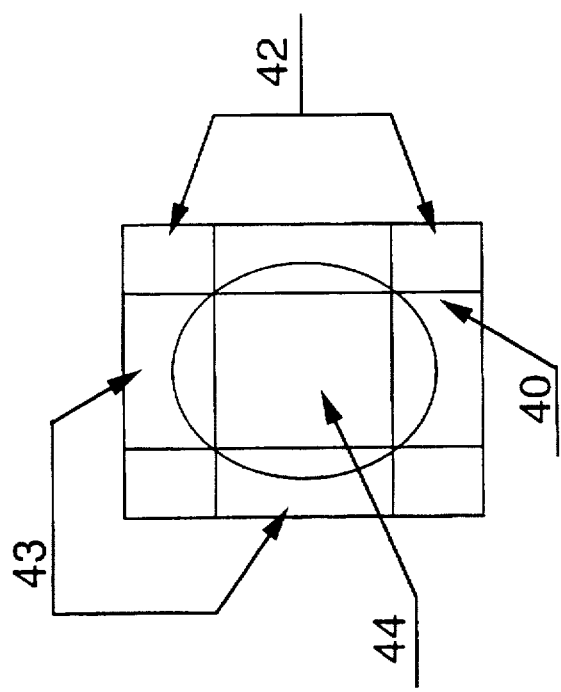
Fig. 1c
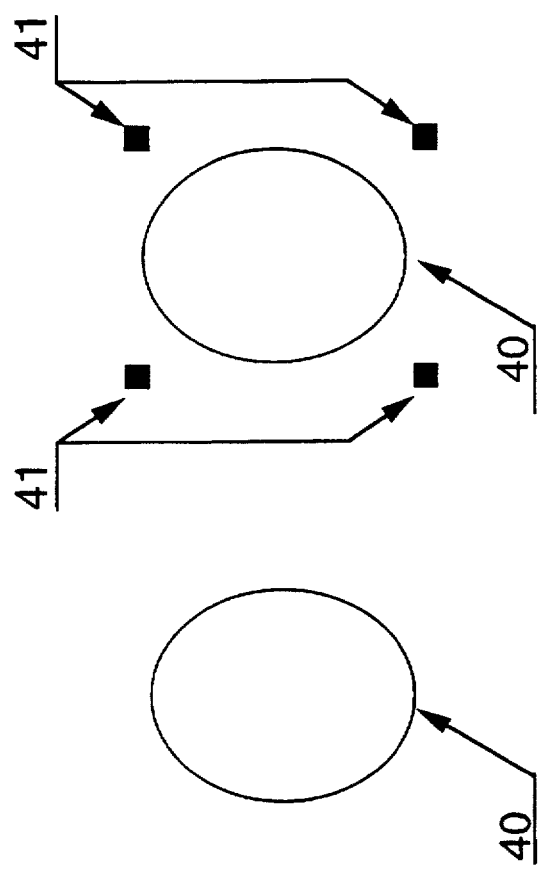
Fig. 1b
Fig. 1a

IMAGE RENDERING SYSTEM WITH EXTENSIBLE MECHANISM FOR PROVIDING VISUAL USER FEEDBACK WHEN AN IMAGE GRAPHIC IS SELECTED

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATIONS

This patent application is related to patent application Ser. No. 8/146,631 now abandoned, entitled *Graphic Editor Framework System*, by Robert Seidl, filed Oct. 29, 1993, and assigned to Taligent, the disclosure of which is hereby incorporated by reference. This patent application is also related to patent application Ser. No. 08/295,442 now abandoned, entitled *Object-Oriented Global Cursor Tool*, by Robson, Watanabe and Watson, filed Aug. 23, 1994, and assigned to Taligent, the disclosure of which is hereby incorporated by reference.

BACKGROUND OF THE INVENTION

1. Field of the Invention

The instant invention generally relates to an extensible mechanism to provide application developers with the facilities to implement customized selection feedback facilities used with a graphical user interface (GUI). The instant invention encompasses apparatus, methods, and software objects that provide this extensible mechanism to an application developer. These facilities enable an application developer to provide a user of a computer pointing device with selection feedback for graphic interaction with the computer. The invention is disclosed in a preferred embodiment using a popular object-oriented programming language, C++, but the principles are applicable to other computer programming languages both object-oriented and procedural.

2. Description of the Prior Art

Background

Object-oriented programming (OOP) is the preferred environment for building user-friendly, intelligent computer software. Key elements of OOP are data encapsulation, inheritance and polymorphism. While these three key elements are common to OOP languages, most OOP languages implement these three elements differently. These elements are described in the above referenced applications (08/295, 442 & 08/295,442).

Examples of OOP languages are Smalltalk, Object Pascal and C++. Smalltalk is more than a programming language; it can be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C. The key concept of C++ is a class, which is a user-defined type. Classes provide object-oriented programming features. C++ modules are compatible with C modules and can be linked freely so that existing C libraries may be used with C++ programs. The most widely used object based and object-oriented programming languages trace their heritage to Simula developed in the 1960s by O-J. Dahl, B. Myhrhaug and K. Nygrad of Norway. Further information on the subject of OOP may be had by reference to *Object-oriented Design with Applications* by Grady Booch, the Benjamin/Cummings Publishing Co., Inc., Redwood City, Calif. (1991).

Data encapsulation, inheritance and polymorphism facilitate creation of graphical user interfaces (GUI). GUIs are typically characterized by a windowing environment having icons, pointing cursors and menus. A GUI is constructed by enhancing classes of an object-oriented GUI framework by using data encapsulation, inheritance and polymorphism.

Another aspect of object oriented programming is a framework approach to application development. One of the most rational definitions of frameworks comes from Ralph E. Johnson of the University of Illinois and Vincent F. Russo of Purdue. In their 1991 paper, *Reusing Object-Oriented Designs*, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

A framework may thus be regarded as a system that provides an implied network of responsibilities between objects, provides for inheritance between classes of objects (e.g., data and methods of superclasses at higher hierarchical levels of classes of objects), and provides for calling of libraries in response to events. A system formed as a framework may also be customized by the addition of objects that perform more specific functions and which may also override functions provided by the framework. Machine-specific and device-specific objects in various classes and subclasses of the framework allow the framework, itself, to be machine- and device-independent and of generalized applicability. Further, a particular framework is characterized by the interrelationships it establishes between objects and classes of objects in terms of division of responsibilities and inheritance and the functionality it thus achieves. A framework, itself, is also useful as a template for the development of specific applications wherein customization and functional overrides may be provided as specific objects.

The class or object in object-oriented programming design encapsulates structure (e.g., data) and behavior (e.g., so-called "method functions") that operate on the structure. In object-oriented design, an interface is an outside view of a class or object of interest. The interface allows other objects to interact with the object of interest while hiding the structure and behavior of the class or object of interest. Additionally, all objects descending from a base class inherit the properties of the base class and thus will have the same properties thereof and are polymorphic with respect to base class operations. Hence, objects descending from the base class can be used to represent an instance of the base class and can be substituted whenever a base class is called.

The Graphic Editor Framework (GrafEdit), described in application Ser. No. 8/146,631 referenced above, provides an object-oriented framework for developing applications with graphical editing capabilities. This framework provides a plurality of classes that define default interactions between the subsystems of the system architecture and the application using the framework; and between the application and other applications. These classes provide methods for drawing, interaction, manipulation and presentation of graphic objects and data. If the application developer desires more complicated features or functions, the application developer can customize and override GrafEdit classes to provide the desired functionality. So long as the developer's customization is encompassed within the framework architecture, it is allowed.

By using a graphical user interface (GUI), the computer user interacts with a graphical display by using a pointing device (e.g., a mouse). The user is able to specify graphical items, rendered by the GUI on a display screen, by moving the pointing device to "point to" and pressing a button to "select" a graphic. Once the graphic is selected its appearance changes to indicate to the user that the selection was successful. A selection feedbacker object or routine creates the altered appearance of the selected graphics. Selected graphics have a semantic meaning that non-selected graphics lack. Therefore, a selected graphic can be the target of an operation that affects the selected graphic.

Along with providing selection feedback to the computer user, the changed appearance of the selected graphic can indicate active control areas that are attached to the selected graphic. These control areas allow the user to perform some command operations on the selected graphic. An example is when a graphic's appearance is changed by adding pointer-sensitive "handles" to the graphic. These handles allow the user to interact with the graphic by invoking an operation by pointing to the handle and "dragging" it. The handle follows the pointer while the pointer moves. During the drag interaction, or when the drag interaction completes, the application performs a specified operation on the graphic.

Often the application developer uses a graphical framework to implement a GUI as described in application Ser. No. 8/146,631 referenced above. These frameworks generally provide the application developer with a limited number of selection feedbackers and graphical operations. These operations generally include moving, copying, pasting and duplicating the graphic. Although a limited number of selection feedbackers helps enforce GUI look and feel consistency, it also restricts the developer's implementation options. Another problem with GUI frameworks is the difficulty in providing special user interactions (feedback and graphical operations) that are dependent on which graphic was selected. An example of this difficulty is if one graphic needs a special user interaction to change the color of the graphic while other graphics require only the standard handle and SRT user interaction. (The handle and SRT selection feedbackers are described below and in application Ser. No. 8/146,631 referenced above.)

There has been a long felt need in the art for an application developer to be able to provide unique and/or custom graphical selection feedback to a user of a graphical user interface. Finally, there has been a long felt need for an application developer to be able to implement custom interaction with a selected graphic beyond the interactions provided by a graphical framework.

Definition of Terms

Active iterator: An object that controls progression through a collection of objects or data structures returning an item of interest (a relevant item).

Class: A set of objects that share a common structure and a common behavior (from *Object Oriented Design with Applications* by Grady Booch, hereinafter OODA).

Command Operation: An operation, supported by a computer application, evoked by a computer user. In the context of the instant invention, a command operation is performed on selected graphics.

Enumeration: An operation that iterates over a collection of objects or data structures. Usually implemented by using an active iterator.

Feedbacker: A short-hand term for Selection Feedbacker (see below).

Framework: a group of interconnected object classes that provide a pre-fabricated structure of a working application.

Graphic interaction: defines the behavior that results when the user interacts with a pointing device, e.g. mouse, within the area of a graphic, even if the graphic, or portion thereof, is not visible.

Inheritance: A relationship between classes, wherein one class shares the structure or behavior defined in one or more other classes (OODA).

Methods: Routines (program logic) contained within an object that implement operations on the object's data.

Object: software entities comprising data structures and operations on the data contained therein.

Object oriented programming: is a manner of implementation wherein programs are organized as cooperative collections of objects, each of which represents an instance of some class, and whose classes are all members of a hierarchy of classes united via inheritance relationships (OODA).

Passive Iterator: An object that processes items passed to it by a caller.

Selection feedback: is a visual distinction of some subset of the graphics displayed by an application to indicate to the user which graphics are the target of some operation.

Selection Feedbacker: is used to refer to the graphical object that, when drawn in front of, or in place of, a selected graphic, provides graphical feedback that indicates the graphic is selected. The selection feedbacker may add additional interactive capability for manipulating the selected graphic (e.g. to scale, rotate or translate it).

Subclass: A class that inherits from one or more classes (OODA).

The Context

This invention is directed towards the Graphic Editor Framework (GrafEdit) and other similar graphical application architectures that need support for extensible selection feedback and graphic interaction. GrafEdit is described in application Ser. No. 8/146,631 referenced above.

The Problem

FIG. 1a depicts two example selection feedbackers applied to a graphic. The graphic for this example is an oval 40 shown in three views (a), (b), and (c). The oval 40 in view (a) represents a non selected graphic. View (b) shows one common style of selection feedback. Once the user has selected the oval 40, handles 41 appear on the graphic. The user can move a pointing device onto one of the handles 41, press a key or button and drag the handle to scale the selected graphic (the oval 40 in this example). View (c) shows the Scale-Rotate-Translate (SRT) feedbacker. If the SRT feedbacker is associated with the oval 40, once the user selects the oval 40 a grid appears containing feature sensitive areas. The user can manipulate the corner areas, two of which are labeled 42, to scale the oval 40 in the same manner as the handles in view (b). The user manipulates the feedbacker edge regions 43 to rotate the oval 40. Finally the user can drag the center area of the feedbacker 44 to move the graphic. The SRT feedbacker is described in more detail in application Ser. No. 8/146,631, referenced above.

In GrafEdit, the selection feedbacker object is a separate graphical object from the selected object. Thus, the underlying graphic is not modified to display the selection feedbacker. Instead, another graphical object is displayed in front, or in place of, the selected graphic. This is different from the prior art wherein a graphic object draws itself differently to provide selection feedback.

The problem solved by the instant invention is that developers have not been able to easily implement custom selection feedbackers or provide custom graphic interaction within a GUI framework because the framework architecture was not extensible. The GrafEdit framework, for example, provided only a single selection feedbacker (the SRT feedbacker). As useful as this feedbacker is, it does not provide all the functionality needed by application developers. Further, there could be only one selection feedbacker for all selected graphics. That single selection feedbacker was drawn on top of all the displayed graphics. This prevented selection feedbacker strategies that used color shifting or inverting selected graphics.

Application developers need the ability to easily implement custom selection feedbackers and specialized graphical operations for user-selected graphical objects. This need extends beyond GrafEdit because any GUI development package, whether or not a framework, will have similar architectural problems. The instant invention discloses and claims a design that supports extensible selection feedback and interaction in GUI architectures whether procedural or object-oriented. This design enables a developer to easily implement custom selection feedbackers and facilitate development of new ways for users to interact with a graphic.

SUMMARY OF THE INVENTION

It is therefore an object of the instant invention to: (1) provide a method to provide a developer-extensible method for supporting selection feedbackers and graphic interaction; and (2) provide object-oriented programming objects that support developer-extensible methods for supporting selection feedbackers and graphic interaction.

BRIEF DESCRIPTION OF THE DRAWINGS

The foregoing and other objects, aspects and advantages will be better understood from the following detailed description of a preferred embodiment of the invention with reference to the drawings, in which.

Diagramming Conventions

Figure 2A:
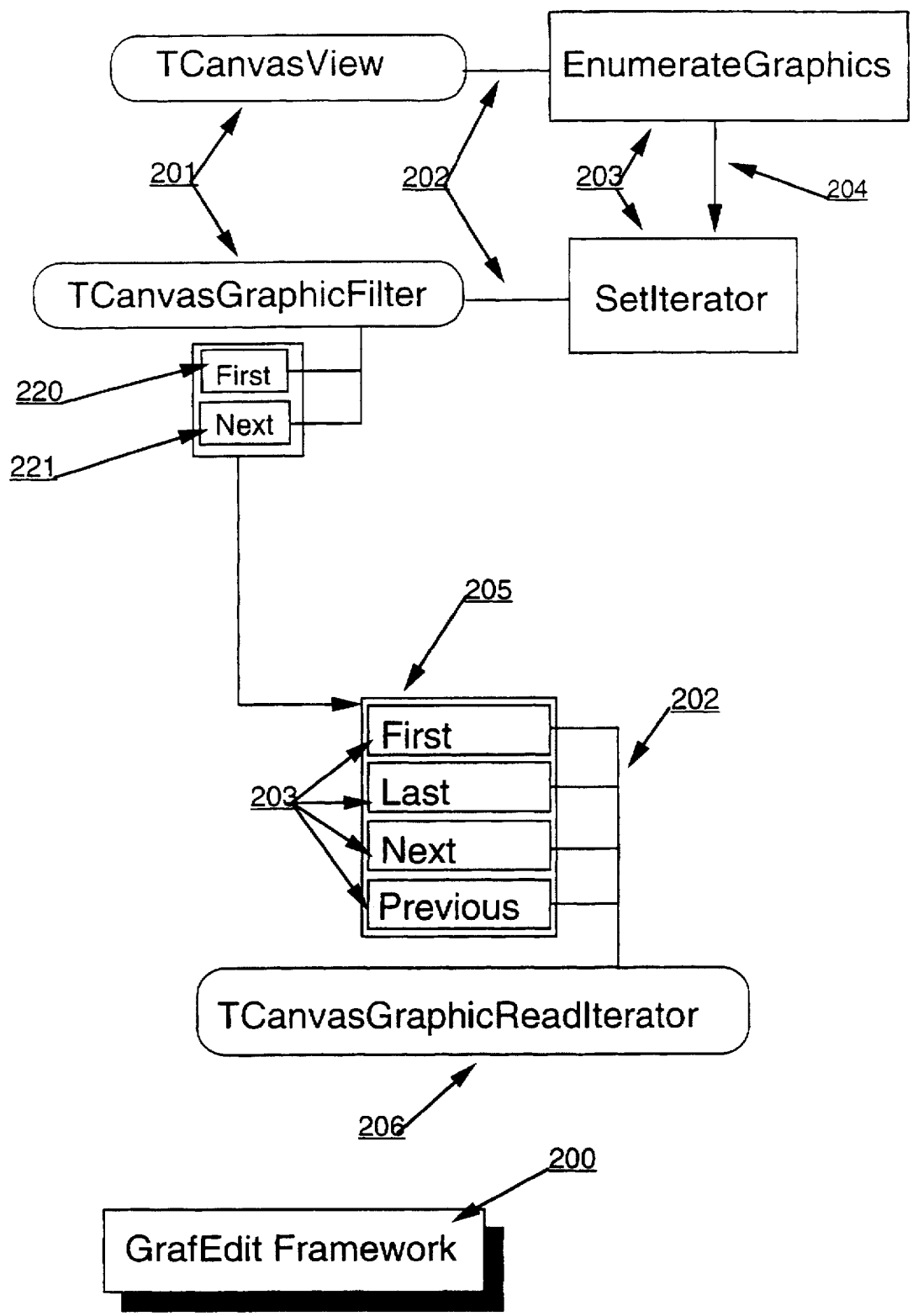
FIGS. 2a and 2b provide examples of the class diagram notation.
Figure 2B:
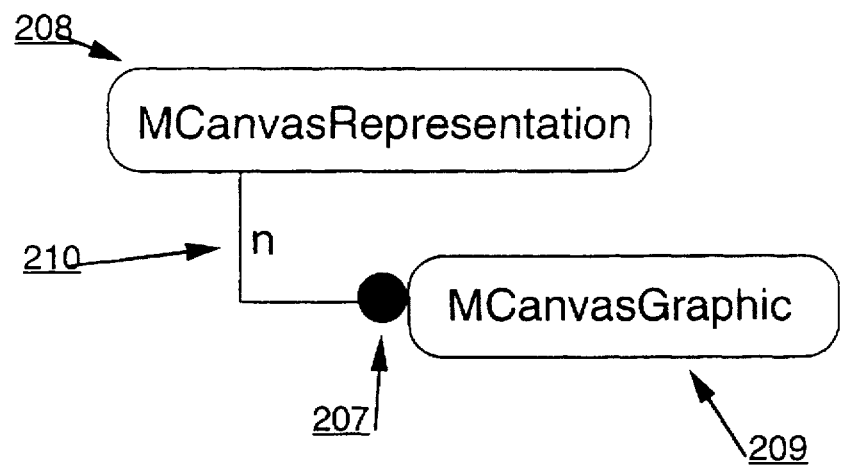
Figure 2B:
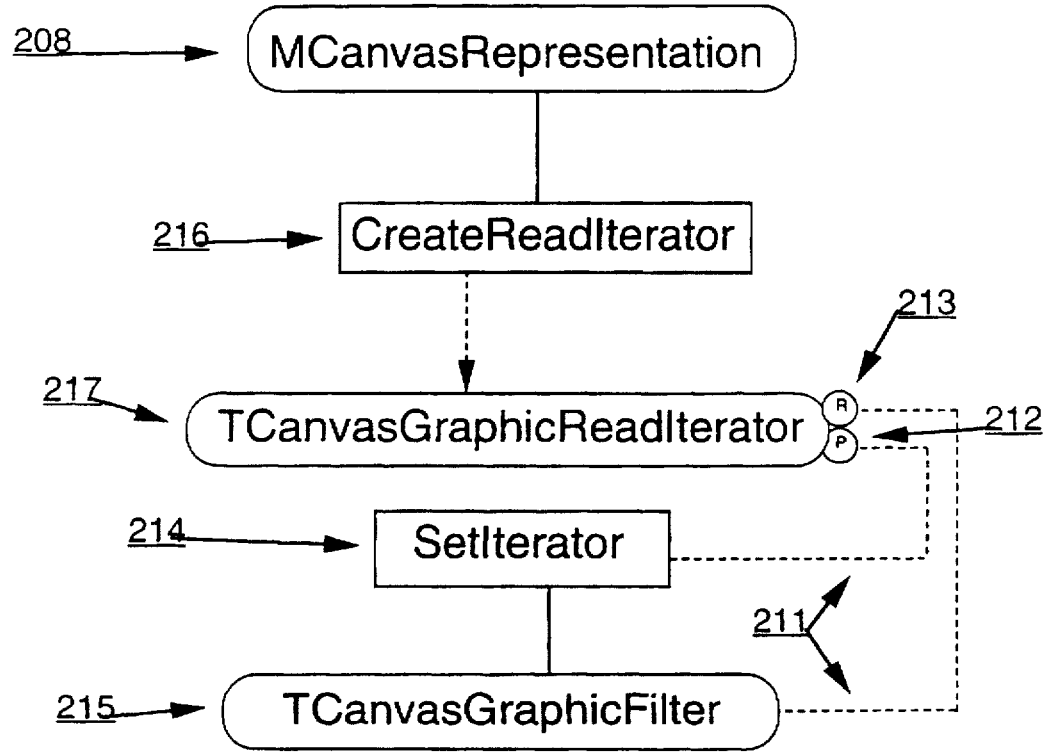

The following conventions are used in many of the figures. Refer to FIGS. 2a and 2b for the examples below. The "xxx::yyy" is a C++ construct known to those skilled in the art. The xxx part is a class name, the yyy part is the name of a method contained in the xxx class.

- Shadowed boxes 200 represent frameworks.
- Rounded boxes 201 represent classes, e.g. TCanvasView.
- Solid lines 202 represent method relationships and square boxes 203 represent the methods, e.g. EnumerateGraphics is a method of TCanvasView.
- Solid lines with arrows at their ends 204 represent method invocation, e.g. TCanvasView::EnumerateGraphics calls TCanvasGraphicFilter::SetIterator.
- Boxes drawn around several methods, (e.g., box 205 is drawn around First, Last, Next and Previous methods of TCanvasGraphicReadIterator 206) is used to simplify the diagram when all methods are used in a similar fashion. (E.g., TCanvasGraphicFilter:: First 220 or::Next 221 can call any or all of these methods in the same way.)
- Solid lines with solid circles at their ends 207 represent containment relationships, e.g. McanvasRepresentation 208 contains an ordered collection of MCanvasGraphics 209. A number along such a line 210 specifies the number of objects contained. When no number is shown, "1" is implied. When the letter "n" is shown, zero or more is implied.
- Dashed lines with circles at their ends 211 represent referential relationships. References imply that objects have access to objects and can invoke their methods, but do not contain them (i.e., do not manage storage of the objects, or own the object or are not responsible for destroying the objects). There are two such relationships depicted.
- A circle containing a "P" 212 denotes that an object of the given class is passed into the method as a parameter, e.g.

a TCanvasGraphicReadIterator 217 is passed to TCanvasGraphicFilter::SetIterator 214 as a parameter.

• A circle containing an "R" 213 denotes a reference to an object of the given class that is contained in some other object. Therefore, a reference to the TCanvasGraphicReadIterator 217 is maintained by the TCanvasGraphicFilter 215.

• A dashed line with an arrow at the end represents object creation, e.g. MCanvasRepresentation::CreateReadIterator 216 creates an instance of TCanvasGraphicReadIterator 217.

DETAILED DESCRIPTION OF A PREFERRED EMBODIMENT OF THE INVENTION

Figure 1D:
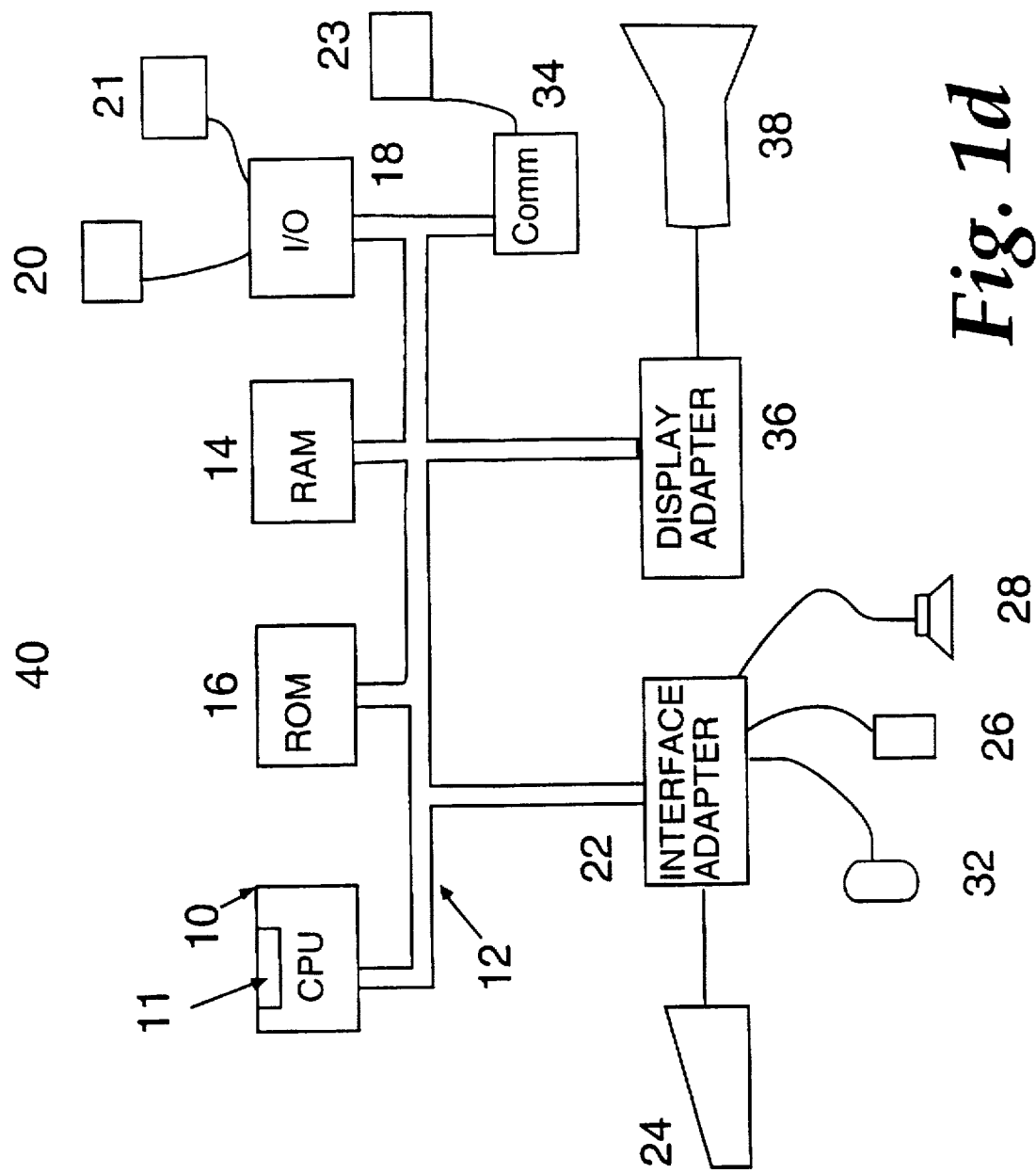
FIG. 1a illustrates examples of selection feedback and graphic interaction.
FIG. 1b is a block diagram of a computer system in accordance with a preferred embodiment.

The invention is preferably practiced in the context of an operating system resident on a personal computer such as the IBM® PS/2® or Apple® Macintosh® computer. A representative hardware environment is depicted in FIG. 1b, which illustrates a typical hardware configuration of a workstation 40 in accordance with the subject invention having a central processing unit 10, such as a conventional microprocessor, and a number of other units interconnected via a system bus 12. The workstation shown in FIG. 1b includes: a Random Access Memory (RAM) 14; Read Only Memory (ROM) 16; an I/O adapter 18 for connecting peripheral devices such as disk units 20 or scanners 21 to the bus; a user interface adapter 22 for connecting a keyboard 24; a pointing device such as a mouse 26; a speaker 28; a microphone 32; and/or other user interface devices such as a touch screen device (not shown) to the bus; a communication adapter 34 for connecting the workstation to a data processing network 23; and a display adapter 36 for connecting the bus to a display device 38. The workstation has resident thereon an operating system 11 such as the Apple System/7® operating system. In a preferred embodiment, the invention is implemented in the C++ programming language using object oriented programming techniques. As will be understood by those skilled in the art, Object-Oriented Programming (OOP) objects are software entities comprising data structures and program logic that perform operations on the data. The program logic that operates on the object's data is commonly called a method of the object. Together, these elements enable objects to model virtually any real-world entity in terms of its characteristics, represented by its data elements, and its behavior, represented by its methods (data manipulation functions). In this way, objects can model concrete things like people and computers, and they can model abstract concepts like numbers or geometrical concepts. The invention is described within the GrafEdit context of application Ser. No. 8/146,631 referenced above. Relevant portions of GrafEdit are summarized below.

GrafEdit

Figure 3:
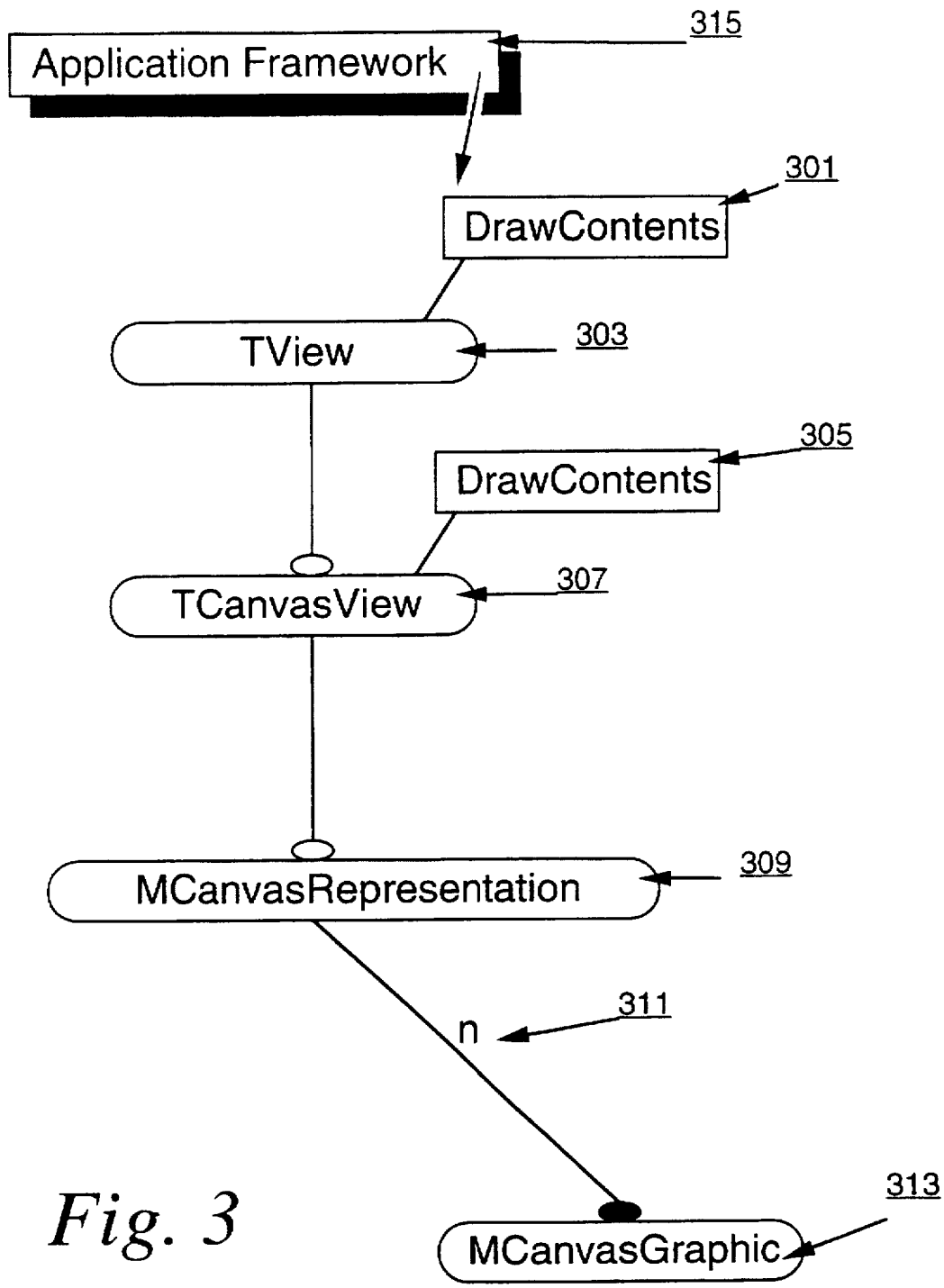
FIG. 3 illustrates the relationship of some of the major GrafEdit classes to the Application Framework.

GrafEdit works within a larger Application framework. As such, several of GrafEdit's classes are formal participants in the Application framework. In FIG. 3 for example, TCanvasview 307 descends from TView 303. TView 303 introduces the DrawContents method 301. The Application framework 315 calls the DrawContents method 301 to request the view to draw itself. TCanvasview 307 overrides Tview's 303 DrawContents method 301 with TcanvasView's 307 own version of DrawContents 305. Thus, Tcanvasview's 307 DrawContents method 305 is used to implement the Application framework's 315 request to draw.

Fundamental GrafEdit Classes

Figure 4:
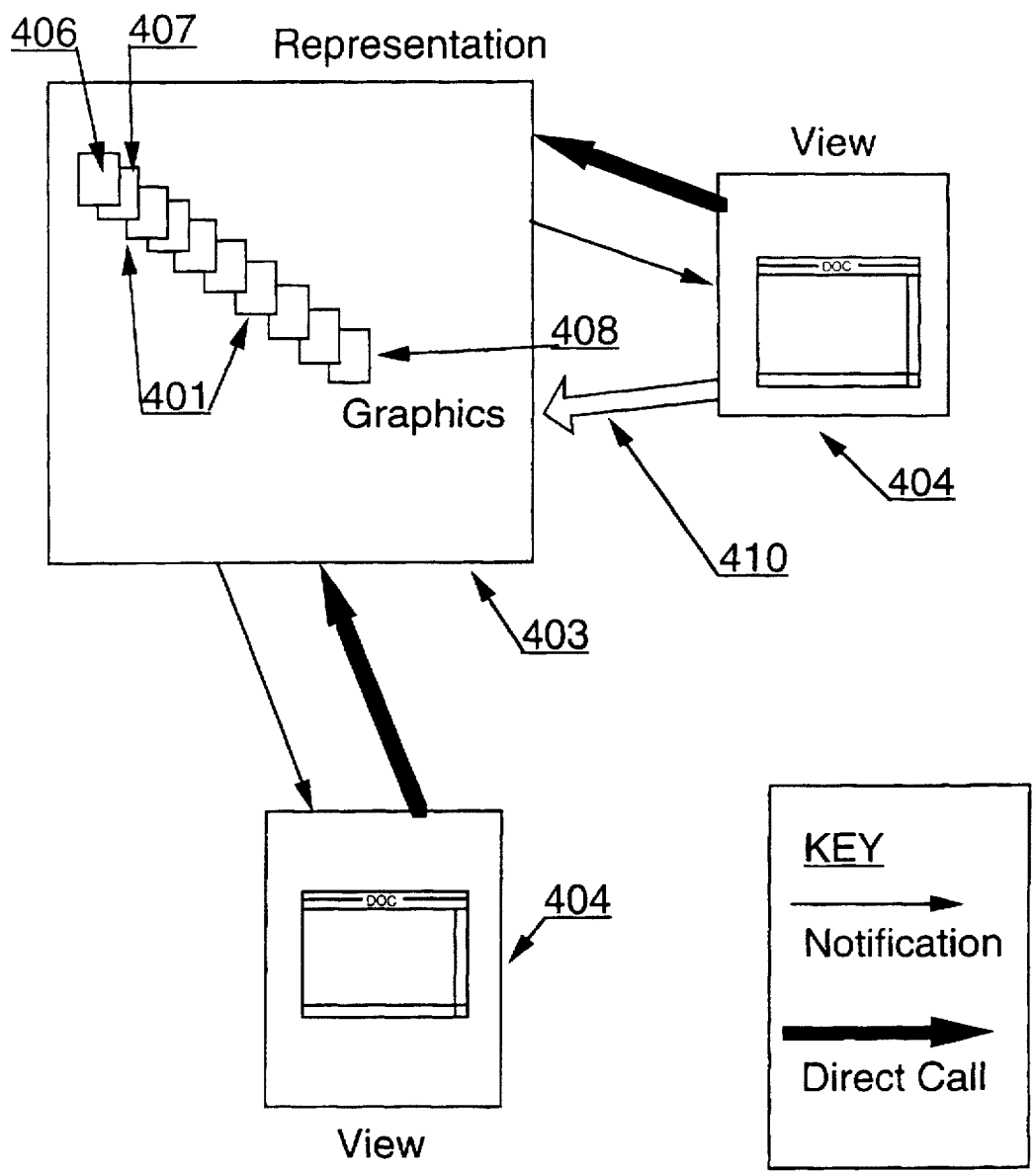
FIG. 4 illustrates the components in the graphic model in accordance with a preferred embodiment.

At the simplest level, GrafEdit has three main elements, "canvas graphics" that represents each graphical element in the canvas, a "canvas representation" that stores a collection of canvas graphics and a "canvas view" that renders the canvas graphics stored in the canvas representation. The canvas view rendering operation results with the canvas graphics being displayed to the user. The canvas view plays a central role in selection and interaction. (In application Ser. No. 8/146,631 these components were termed the "Component," the "Model," and the "Canvas" respectively.) These elements and their fundamental interrelationships are shown in FIG. 4. The canvas representation 403 contains the canvas graphics 401. The canvas representation 403 also includes object methods (not shown) to manage the canvas graphics 401 in the representation 403. The canvas view 404 renders the canvas graphics 401 stored in the canvas representation 403. As the user interacts with the view 404, the view 404 manipulates the canvas representation 403 via commands as indicated by arrow 410. The representation 403 notifies client objects of any change made to the canvas representation 403. Upon receiving notification of the change in the canvas representation 403 these client objects may process the representation. Thus, when the canvas representation 403 changes, canvas view 404 is notified of the change and displays itself by creating or updating the display by causing the canvas graphic objects 401 to display themselves.

Canvas Graphics 401

Each graphical object that can be displayed is a canvas graphic (two of which are indicated by 401). The canvas representation 403 maintains a collection of canvas graphics 401. The canvas view 404 assumes the canvas graphic protocol for drawing, hit detection, selection and interaction. Canvas graphics 401 are derived from the MGraphic class (described in application Ser. No. 8/146,631 referenced above). The MGraphic class provides the basic protocol for two dimensional graphical operations. These protocols include those for transforming the graphic, finding the bounds of the graphic, and detecting whether the graphics intersects a given point.

The Canvas Representation 403

Each GrafEdit application has at least one canvas representation 403. The canvas representation stores and manages the canvas graphics 401 used by the application. The canvas representation 403 also provides several methods for adopting canvas graphics 401 into storage, removing canvas graphics 401 from storage, and finding canvas graphics 401 within storage. The canvas graphics 401 within the canvas representation 403 are ordered from front to back such that canvas graphic 406 is the front-most canvas graphic, followed by 407 and so forth until canvas graphic 408—the back-most canvas graphic. When canvas view 404 draws the canvas representation 403, canvas graphics at the front of storage 406 are drawn on top of canvas graphics further back in storage 407, 408. The canvas representation also provides methods for altering the order of the stored canvas graphics. These methods include moving canvas graphics to the back, to the front, forward towards the front and backward towards the back. Finally, the canvas representation 403 provides facilities for iterating over the collection of canvas graphics 401 stored in the canvas representation 403.

The Canvas View 404

A canvas view 404 draws the contents of a canvas representation 403. A canvas view 404 also facilitates selection and interaction with canvas graphics 401 in the underlying canvas representation 403. Many canvas view 404 methods are invoked by the Application and GrafEdit frameworks. (One example involves interactors. Interactors are disclosed in application Ser. No. 08/295.442 referenced above.) However, some canvas view methods are directly called by developer-written classes. Developers implement the application's appearance and behavior by creating a subclass of TCanvasview, or a subclass of a TCanvasView subclass.

Enumerators, Filters, and Funnels

One of the more important functions of the canvas view 404 is that of performing an operation on all or some of the graphics in the representation. As implemented in the canvas view class, the instant invention comprises an Enumerate-Graphics method, added to the canvas view object, and two classes, TCanvasGraphicFilter and TCanvasGraphicFunnel. To render the canvas graphics 401 stored in the canvas representation 403, the canvas view 404 must first create filter and funnel objects. The filter object is used to select and order which canvas graphics 401 are to be drawn. The funnel is used to process each of the canvas graphics 401 selected by the filter. In the example shown in Table 1, the canvas view 404 passes both the filter and funnel objects to the canvas view's EnumerateGraphics method. The EnumerateGraphics method passes the canvas graphics 401 furnished by the filter to the funnel for processing. Since developers can create custom filters and funnels, they can freely control which canvas graphics 401 are selected for processing, the order that the canvas graphics are processed and how the selected graphics are processed.

TABLE 1

TCanvasTopSelectionDrawingFilter filter (aSelection);
TCanvasDrawingFunnel funnel (aGrafPort);
EnumerateGraphics (filter, funnel);

The filter object is not limited to simply selecting canvas graphics from the canvas representation. The filter object also controls the sequence that canvas graphics are presented to the funnel. Thus, the filter can perform a sorting function. The filter can also introduce new graphics not contained within the canvas representation. This function is extremely important when implementing selection feedbackers. Selection feedbackers are temporary canvas graphics added to the display to indicate which graphics are selected and, optionally, to provide means for the user to interact with the graphics—through interactors. Selection feedbackers are not stored in the canvas representation 403. For example, the SRT feedbacker is a temporary canvas graphic that is rendered in front of the image of the selected graphic by the TCanvasTopSelectionHitDetectionFilter and the TCanvasTopSelectionDrawingFilter objects.

The EnumerateGraphics method (program logic) along with filter and funnel objects decouples the details of accessing the canvas representation data from iteration control and graphic processing. As a result, each of these elements is independently extensible without affecting the other two. For example, the same drawing code (encapsulated in a funnel object) can be reused independent of the underlying representation class and independent of the selection drawing strategy. This independently-extensible feature of the instant invention provides application developers with increased flexibility when implementing GUI based applications. Thus, the instant invention has utility.

Canvas filter and funnel objects furnish and process canvas graphics in the canvas view during drawing, hit detection, application initiation and similar processes. Filters select and sequence which graphics are to be processed. Funnels operate on each graphic furnished by the filter.

There are many possible funnel operations. A funnel may perform any operation that does not directly modify the canvas graphic returned by a filter. These operations include, among others, display, hit detection, graphic selection, sorting, and classifying operations.

In summary, the purpose of the EnumerateGraphics method is to bind a canvas view to a particular underlying storage scheme. The purpose of the filter object is to present canvas graphics from the representation to a funnel object. The funnel object operates on the presented canvas graphics to perform the task the developer implemented in the funnel object.

EnumerateGraphics Operation

Figure 5:
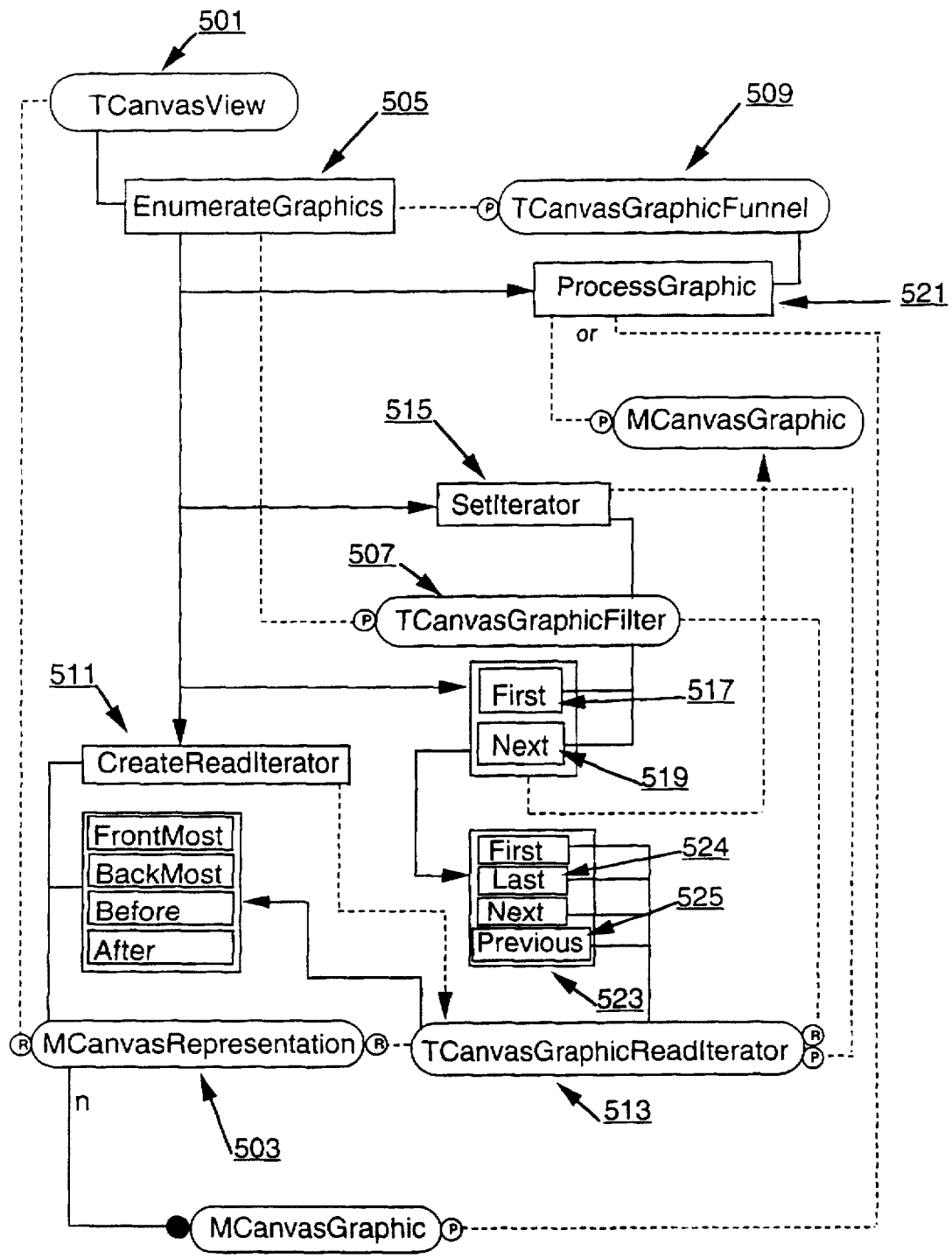
FIG. 5 is an object diagram illustrating the relationship of the classes, methods, and interactions in the invention.

FIG. 5 shows the graphics enumeration behavior of the canvas view 404. This behavior is central to extensible selection feedback and interaction. Graphic enumeration is used in the canvas view to perform various read-only operations over graphics in the underlying canvas representation and other objects. Examples of these operations include, drawing, hit detection, interaction, and others. While enumeration is not used to directly modify graphics, enumeration can result in identifying graphics that will ultimately be changed by commands.

Table 2 shows a preferred embodiment of EnumerateGraphics written in C++. The client passes a filter object to EnumerateGraphics. EnumerateGraphics uses this filter object to select which graphics are included in the enumeration and the sequence that these graphics are presented to the funnel object. Thus, the filter uncouples the control of what is included in enumeration and the enumeration sequence, from the internal details of how the enumeration is implemented and the access protocol of the underlying canvas representation. EnumerateGraphics creates a TCanvasReadIterator object and gives this iterator to the client's filter object. EnumerateGraphics then uses the filter object to unidirectionally iterate over the canvas graphics contained in the canvas representation. The EnumerateGraphics implementation, shown in Table 2, uses MCanvasRepresentation::CreateReadIterator to return an iterator. If desired, developers may implement proprietary access methods instead of using the iterator created by the canvas representation. The returned iterator supports bi-directional, read-only iteration over the canvas graphics contained in the canvas representation. EnumerateGraphics does not directly use this iterator. Instead, EnumerateGraphics passes this iterator to the client-provided filter object that was passed by the client to EnumerateGraphics.

TABLE 2

```
// COPYRIGHT TALIGENT, Inc. 1994
void
TStandardCanvasView::EnumerateGraphics
                    (TCanvasGraphicFilter& filter,
                     TCanvasGraphicFunnel& funnel) const
{
  TDocumentComponentReadEntry entry (GetModelReference ());
  const TStandardCanvasModel *model =
  LookupCanvasModelForReading (entry);
  if ( model ) {
    TCanvasGraphicReadIterator *i =
      ((TstandardCanvasModel*)model)->CreateReadIterator ();
    if ( i ) {
      filter.SetIterator (i);
      const MCanvasGraphic *c = filter.First ();
      if ( c ) {
        while ( c ) {
          if ( funnel.ProcessGraphic (*c) )
            c = (MCanvasGraphic*)filter.Next ();
```

TABLE 2-continued

```
    else
        c = NIL;
    }
    }
    delete i;
    }
}
```

FIG. 5 graphically shows the operation of EnumerateGraphics 505. The canvas view 501 references the canvas representation 503. EnumerateGraphics 505 receives two parameters, a canvas graphic filter 507 and a canvas graphic funnel 509. EnumerateGraphics 505 calls the representation's CreateReadIterator 511 method to create a canvas graphic read iterator 513 and then passes the canvas graphic read iterator 513 to the filter's SetIterator 515 method. The filter 507 retains a reference to the iterator 513. Then EnumerateGraphics 505 calls the filter's First method 517. Subsequently, EnumerateGraphics 505 calls the filter's Next method 519 for so long as these methods continue to furnish (return) canvas graphics. If either of these methods returns NIL. EnumerateGraphics 505 has completely iterated over the potentially relevant canvas graphics. For each canvas graphic furnished by (returned from) the filter's First 517 and Next 519 methods. EnumerateGraphics passes the canvas graphic to the funnel's ProcessGraphic method 521 for processing.

Before calling the filter's First 517 and Next 519 methods, EnumerateGraphics 505 seeds the filter 507 with a canvas graphic read iterator 513. The read iterator 513 provides the filter 507 with access to the canvas graphics stored in the canvas representation 503. The filter 507 can call the iterator's 513 First, Last, Next and Previous methods 523 in various combinations to select which canvas graphics are returned and their sequence. For example, if the filter 507 implements its First method 517 to call the iterator's 513 Last method 524 and if the filter 507 implements its Next method 519 to call the iterator's 513 Previous 525 method, the graphics will be parsed from back to front.

The filter 507 is capable of sophisticated operations (e.g., such as selecting canvas graphics in order of size or initially selecting all squares, followed by all lines, followed by other shapes). Another capability of the filter 507 is that it can introduce canvas graphics that do not exist in the canvas representation. For example, the filter 507 may return additional graphics to provide selection-handle and SRT feedbackers. Furthermore, the filter 507 may return a completely different canvas graphic from the one obtained from the canvas representation 503. This capability allows the filter 507 to return inverted or color shifted versions of user-selected graphics.

Those skilled in the art will recognize that filter 507 controls which canvas graphics are processed, the order that the canvas graphics are processed and that the filter can insert canvas graphics that are not present in the canvas representation to modify the displayed image from that contained in the canvas representation.

Filter Operation

Table 3 is illustrates a C++ embodiment of a filter that enumerates from back to front (i.e., the filter is used to provide the canvas graphics to a drawing funnel for rendering) and interjects selection feedback graphics on top of all selected graphics. The filter can use the canvas representation read iterator in various ways. For example, the iteration direction can be reversed by implementing the filter's Next method to call the canvas graphic read iterator's Previous method as shown in the TCanvasTopSelectionDrawingFilter::Next routine in Table 3. The filter can skip undesired graphics by calling the canvas graphic read iterator's Next or Previous methods multiple times before returning. The filter can also introduce and return graphics that it creates in place of, or in addition to, those that the canvas graphic read iterator returns. Thus, the graphics processed by the funnel do not necessarily have a one-to-one correspondence with the canvas graphics stored in the canvas representation. For example, selection feedback graphics are temporary and not contained in the canvas representation.

TABLE 3

```
// COPYRIGHT TALIGENT, Inc. 1994
class TCanvasTopSelectionDrawingFilter : public TCanvasSelectionFilter
{
public:
    TCanvasTopSelectionDrawingFilter (
                        const MCanvasSelection* referenceSelection);
    virtual -TCanvasTopSelectionDrawingFilter ();
    // Iteration from back to front
    virtual const MCanvasGraphic*    First ();
    virtual const MCanvasGraphic*    Next ();
private:
    void*                            fExtension;
    const MCanvasSelection*          fSelection;         // not owned
    bool                             fSelectionPass;
    MCanvasGraphic*                  fCurrentFeedbacker;  // not owned
};
TCanvasTopSelectionDrawingFilter::TCanvasTopSelectionDrawingFilter (
                        const MCanvasSelection* selection)
    TCanvasSelectionFilter(),
    fSelection (selection),
    fSelectionPass (false),
    fCurrentFeedbacker (NIL) { }
TCanvasTopSelectionDrawingFilter::~TCanvasTopSelectionDrawingFilter
                                    () { }
const MCanvasGraphic*
TCanvasTopSelectionDrawingFilter::First ()
{
    TCanvasGraphicReadIterator *i = GetIterator ();
    const MCanvasGraphic* first = NIL;
    if ( i )
        first = i->Last ();
    return first;
}
const MCanvasGraphic*
TCanvasTopSelectionDrawingFilter::Next ()
{
    TCanvasGraphicReadIterator *i = GetIterator ();
    const MCanvasGraphic* next = NIL;
    if ( i ) {
        next = i->Previous ();
        if ( next == NIL && !fSelectionpass && fSelection != NIL ) {
            fSelectionpass = true;
            next = i->Last ();
        }
        if ( fSelectionPass ) {
            while (next != NIL && !fSelection->IsGraphicSelected(*next))
                next = i->Previous ();
            if ( next != NIL ) {
                fCurrentFeedbacker = GetGraphicFeedbacker (*next);
                if (!fCurrentFeedbacker)
                    fCurrentFeedbacker = GetCanvasFeedbacker (*next);
                next = fCurrentFeedbacker;
            }
        }
    }
    return next;
}
```

Figure 6:
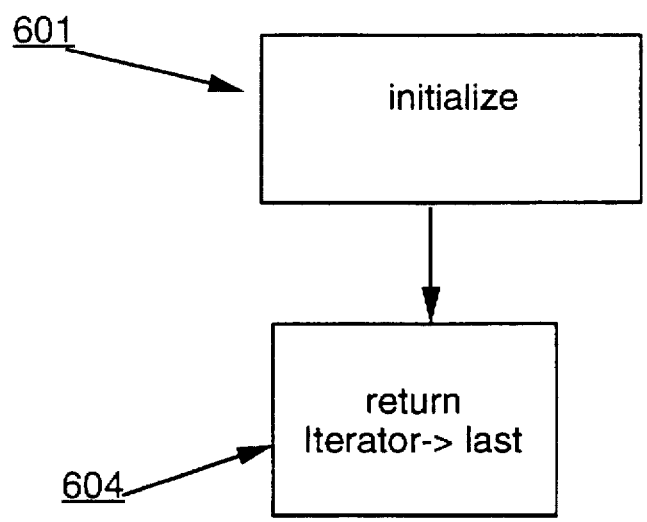
FIG. 6 is a flow chart of the operation of the "first" method of a filter.
Figure 7:
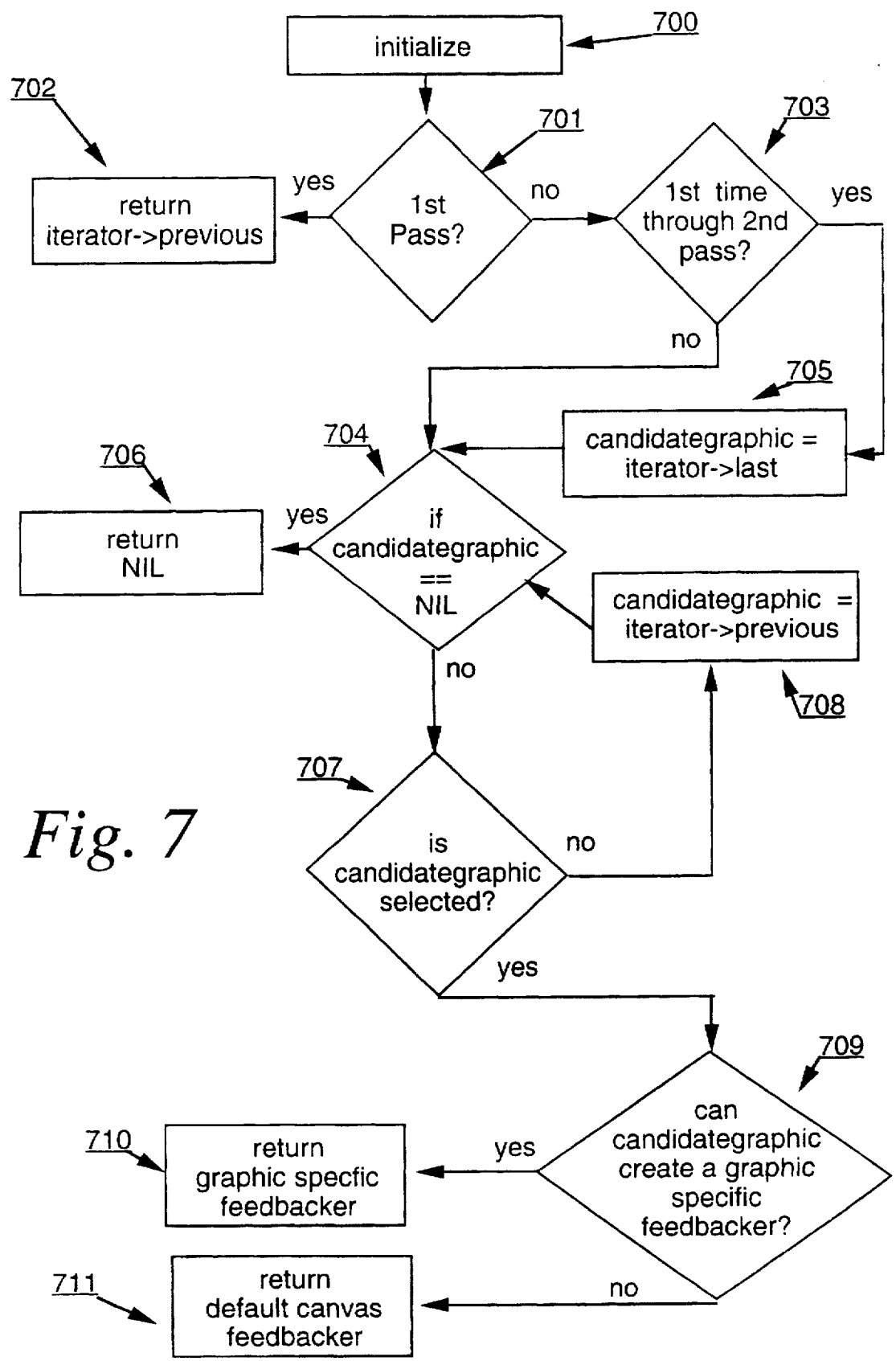
FIG. 7 is a flow chart of the operation of the "next" method of a filter.

The concepts in Table 3 are illustrated by FIGS. 6 and 7. These figures have been simplified for clarity but provide a conceptual overview of the program logic in Table 3. FIG. 6 illustrates the filter object's first method. The initialization block 601 represents the initialization functions for the first method. Initialization consists of obtaining an iterator and initializing the variable first to NIL. After initialization, if the iterator was not obtained during the initialization block 601, the method simply returns first (which will contain NIL) by returning via the return block 604. If an iterator was obtained during initialization, execution continues and the method returns iterator→Last (the back-most canvas graphic in the canvas representation) through the return block 604.

FIG. 7 illustrates the filter object's next method. This method is entered via the initialization block 700. The first-pass-decision block 701 detects if the first pass is complete (i.e., that all canvas graphics have been enumerated). If the first pass is not complete, the method returns the next canvas graphics (obtained from iterator→Previous) and exits via the return block 702. If the first pass is complete, execution passes to decision block 703. If this is the first entry into the second pass, execution passes to block 705 where candidategraphic is set to iterator→Last (hence obtaining the back-most graphic from the canvas representation) and execution passes to decision block 704, otherwise execution passes directly to decision block 704. At decision block 704 if candidategraphic contains NIL (indicating that iteration is complete) the method returns NIL through block 706. If candidategraphic does not contain NIL, execution passes to decision block 707. If the graphic contained in candidategraphic is not selected, execution continues to block 708. Block 708 sets candidategraphic to the next canvas graphic toward the front of the representation. Execution then loops again to decision block 704. However, at decision block 707 if candidategraphic contained a canvas graphic that was selected, execution continues to block 709. Some canvas graphics can create graphic-specific selection feedbackers. Decision block 709 detects if the graphic in candidategraphic includes this capability. If so, execution advances to block 710 which creates and returns the graphic specific selection feedbacker. If the graphic in candidategraphic can not create a graphic-specific selection feedbacker, execution advances to block 711 which creates and returns the default selection feedbacker.

Funnel Operation

Those skilled in the art will recognize that the funnel object processes the canvas graphics provided by the enumerator (returned by the filter) according to the program logic contained in the funnel object (not shown). A drawing funnel object draws each graphic presented by a filter. A hit detection funnel object performs hit detection of a given coordinate against each canvas graphic presented by the filter and can determine the front-most graphic that contains the coordinate. Canvas graphic funnel objects decouple how each enumerated canvas graphic is processed from the internal details of how each canvas graphic is enumerated. Further, Canvas graphic funnels decouple how the canvas graphic is processed from the access protocol of the underlying canvas representation.

Figure 9:
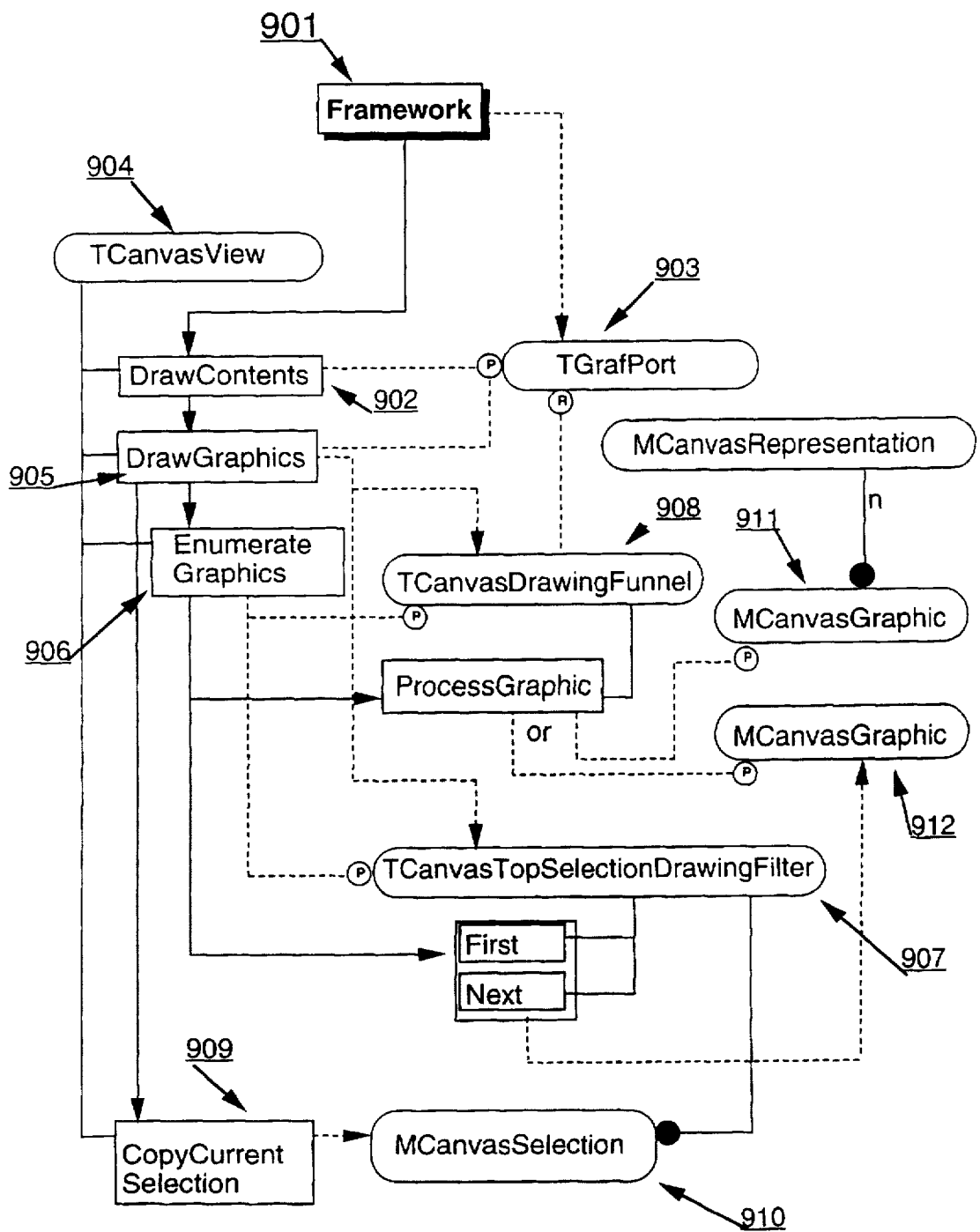
FIG. 9 is an object diagram illustrating the relationships between the classes, methods, and their interactions using the invention to render graphics with a selection feedback.

Canvas graphic funnels are passive iterators that process graphics enumerated in TCanvasView::EnumerateGraphics 505. Clients create and pass a funnel object 509 to EnumerateGraphics 505. EnumerateGraphics 505 calls the funnel object's ProcessGraphic method 521 for each graphic returned by the filter object 507 in the order the filter object 507 provides them. Developers create funnel subclasses and override the ProcessGraphic method 521 to provide custom processing for the enumerated canvas graphic objects (e.g., drawing each graphic). An example of this is shown in FIG. 9 (described in detail in the Drawing Graphics description below). In FIG. 9, a client creates and passes a TCanvasDrawingFunnel object 908 (corresponding to funnel object 509) to EnumerateGraphics 906 (corresponding to the method at 505) to render the canvas graphics passed by the filter object 507. 907. In this case, TCanvasDrawingFunnel 908 is constructed from a port object 903. TCanvasDrawingFunnel 908 uses the port 903 to render the canvas graphics. By creating various types of ports, developer can affect the drawing in various ways (e.g., such as to draw all graphics with a scale factor of 10x or with a red frame color).

The architecture of the instant invention requires that ProcessGraphic return FALSE to pre-terminate the enumeration. This is demonstrated in a preferred embodiment of EnumerateGraphics 505 as shown in Table 2. For example, a hit detection funnel object would return FALSE upon reaching the canvas graphic object that intersected the pointing device to avoid looking at other canvas graphic objects.

Other funnel objects can use the canvas graphic in ProcessGraphics to create different objects that exist beyond the scope of ProcessGraphics. For example, while TCanvasDrawingFunnel 908 draws the graphic into a port, TCanvasInteractionFunnel 1104 calls the graphic to create an interactor.

Selections

The TCanvasSelection class is used to represent a collection of zero or more canvas graphics that are stored in the canvas representation. Canvas graphics within this collection are the target of some operation (e.g., a command). GrafEdit commands are bound to a canvas selection object. Thus, the canvas selection object specifies which canvas graphics in the representation are to be affected by the command. A special selection is the "current selection". The current selection contains the currently selected canvas graphics. The application maintains a single canvas selection for this purpose. This canvas selection is accessed by canvas view methods, AdoptCurrentSelection, SetCurrentSelection, and CopyCurrentSelection. The canvas selection object contains methods to make a canvas graphic selected (SelectGraphic), and to determine which graphics are selected (IsGraphicSelected).

As discussed below, in the preferred embodiments, the view's DrawContents method calls DrawGraphics to render the canvas graphics that appear in front of any background and behind any operation feedback. This is a layer concept. First the background layer is rendered, then the graphics layer, and finally the feedback layer. This feedback layer is not associated with selection feedbackers. Feedbackers are canvas graphics drawn on top of canvas graphics that are in the canvas representation and the current selection. The feedback layer is a graphics layer used to provide manipulation feedback to a user who is modifying a graphic. (e.g., rubberbanding.)

Figure 8:
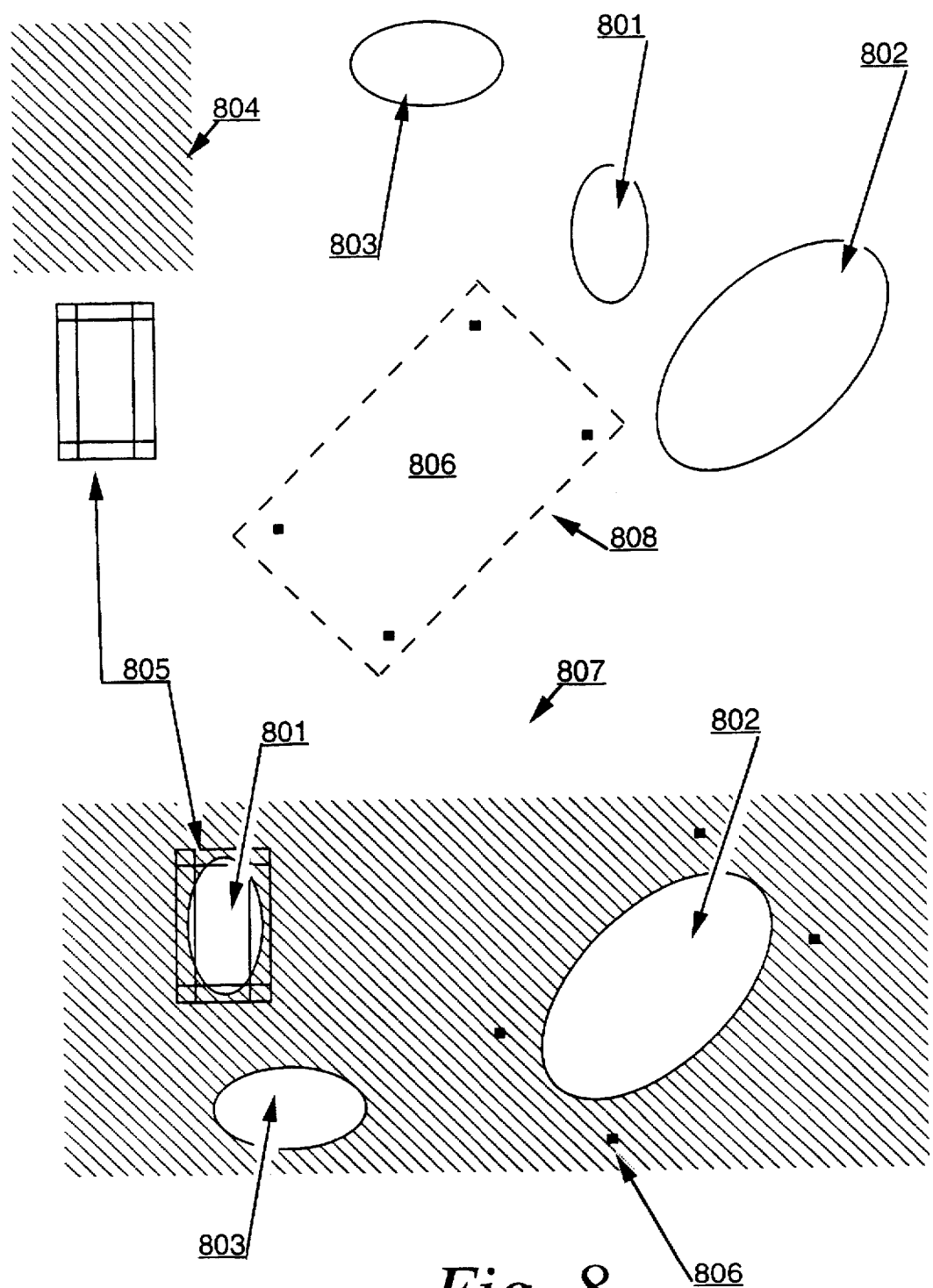
FIG. 8 illustrates the layering concept of rendering canvas graphics and selection feedbackers.

DrawGraphics renders the graphics layer. In a preferred embodiment, DrawGraphics makes two passes over the canvas representation. The first pass renders the canvas graphics in the canvas representation. The second pass draws selection feedbacker graphics on top of the canvas graphics within the "current selection". Other possible embodiments can be implemented by the application developer as required. FIG. 8 illustrates the operation of the multiple pass embodiment. The ovals 801, 802 and 803 are first drawn in front of the background 804. Only a portion of the background 804 is shown. Assume ovals 801 and 802 are selected. Thus, these canvas graphics are also contained in the current selection object. Oval 801 uses the default canvas selection feedbacker 805, and oval 802 includes a special selection feedbacker 806 (a handle feedbacker). Note that the dashed lines 808 containing the four small squares and the label "806" are not part of the feedbacker, but simply associate the four separated small squares with their label. As described above, selection feedbacker graphics are added to the rendered image after the canvas graphics are drawn. Thus, feedbacker images are superimposed on the canvas graphic image creating the complete rendered image 807. Any interactive feedback graphics that may be required are then rendered in the feedback layer in front of the graphics layer. An example of an interactive feedback graphic is seen when a user selects multiple graphics by dragging the pointing device. The interactive feedback graphic is the rubberband-rectangle that surrounds the selected graphics.

Examples of Preferred Embodiments in GrafEdit

The following describes selected preferred embodiments of the instant invention. These embodiments illustrate how to use the invention to perform drawing, hit detection and user interaction with canvas graphics. The invention enables application or program developers to implement their own customized strategies for user/graphic interactions.

Drawing Graphics

FIG. 9 shows how GrafEdit uses the invention to draw graphics. The Framework 901 calls the view's 904 DrawContents method 902, passing a graf port object 903. Anything drawn into the graf port object 903 will appear on the screen, relative to and clipped by the application's window. DrawContents 902 calls three methods: DrawBackground (not shown), DrawGraphics 905, and DrawFeedback (not shown). DrawBackground defaults to draw a solid background. However, a developer can customize DrawBackground to draw anything that should appear behind all other graphics. DrawGraphics 905 draws the graphics in the representation and any selection feedbackers. DrawFeedback draws a temporary feedback layer in front of all graphics. Feedback is associated with interaction (e.g. rubberbands that appear while drawing new graphics).

DrawGraphics 905 uses EnumerateGraphics 906 to select and render the canvas graphics. As described above, DrawGraphics 905 passes filter 907 and funnel 908 objects to EnumerateGraphics 906. In this embodiment the default filter is a TCanvasTopSelectionDrawingFilter object 907 and the default funnel is a TCanvasDrawingFunnel object 908. Developers can subclass these classes to implement customized drawing behavior. TCanvasTopSelectionDrawingFilter 907 is constructed from the MCanvasSelection 910 object that DrawGraphics 905 created by calling CopyCurrentSelection 909. TCanvasDrawingFunnel 908 is constructed from the graf port object 903 passed to DrawContents 902 by the framework 901. Once constructed, TCanvasDrawingFunnel 908 is passed to EnumerateGraphics 906. In addition, TCanvasDrawingFunnel 908 references the graf port object 903 and renders each canvas graphic passed to it during enumeration into the graf port object 903.

TCanvasTopSelectionDrawingFilter 907 selects graphics from the representation from back to front (the standard drawing order so that front graphics are drawn over back graphics). During enumeration, TCanvasTopSelectionDrawingFilter 907 makes two passes over the canvas graphics in the canvas representation. On the first pass, the filter 907 returns the actual canvas graphics. These canvas graphics are processed and drawn before the selection feedbackers are processed (hence, displayed behind the selection feedbackers). On the second pass the filter 907 uses the selection 910 to determine which graphics are selected. For each selected graphic the filter 907 returns a selection feedbacker 912. Thus, the feedbackers are drawn on top of the canvas graphics contained in the canvas representation.

The selection feedback graphics can be created in one of two ways. First, the filter can call the selected canvas graphic's CreateFeedbacker method, giving the graphic an opportunity to supply a graphic-specific selection feedbacker. If the graphic returns a selection feedbacker (the return was not NIL) this selection feedbacker is drawn. Second, if the graphic returns NIL then the filter 907 uses a default selection feedbacker.

This architecture allows the developer to extend selection feedback and drawing facilities. The developer simply overrides DrawGraphics 905 and constructs and passes specialized filters and funnels to EnumerateGraphics 906. For example, to implement a folder that shows selection of documents by color shifting icons the developer might implement a TCanvasGraphicColorShiftingDrawingFilter (not shown) that returns color shifted graphics in place of selected graphics in the representation. Color shifted graphics could be implemented as wrappers around the real graphics that implement the MCanvasGraphic::Draw method to change the graf port for color shifting and then call the original canvas graphic's Draw method.

Hit Detection

Figure 10:
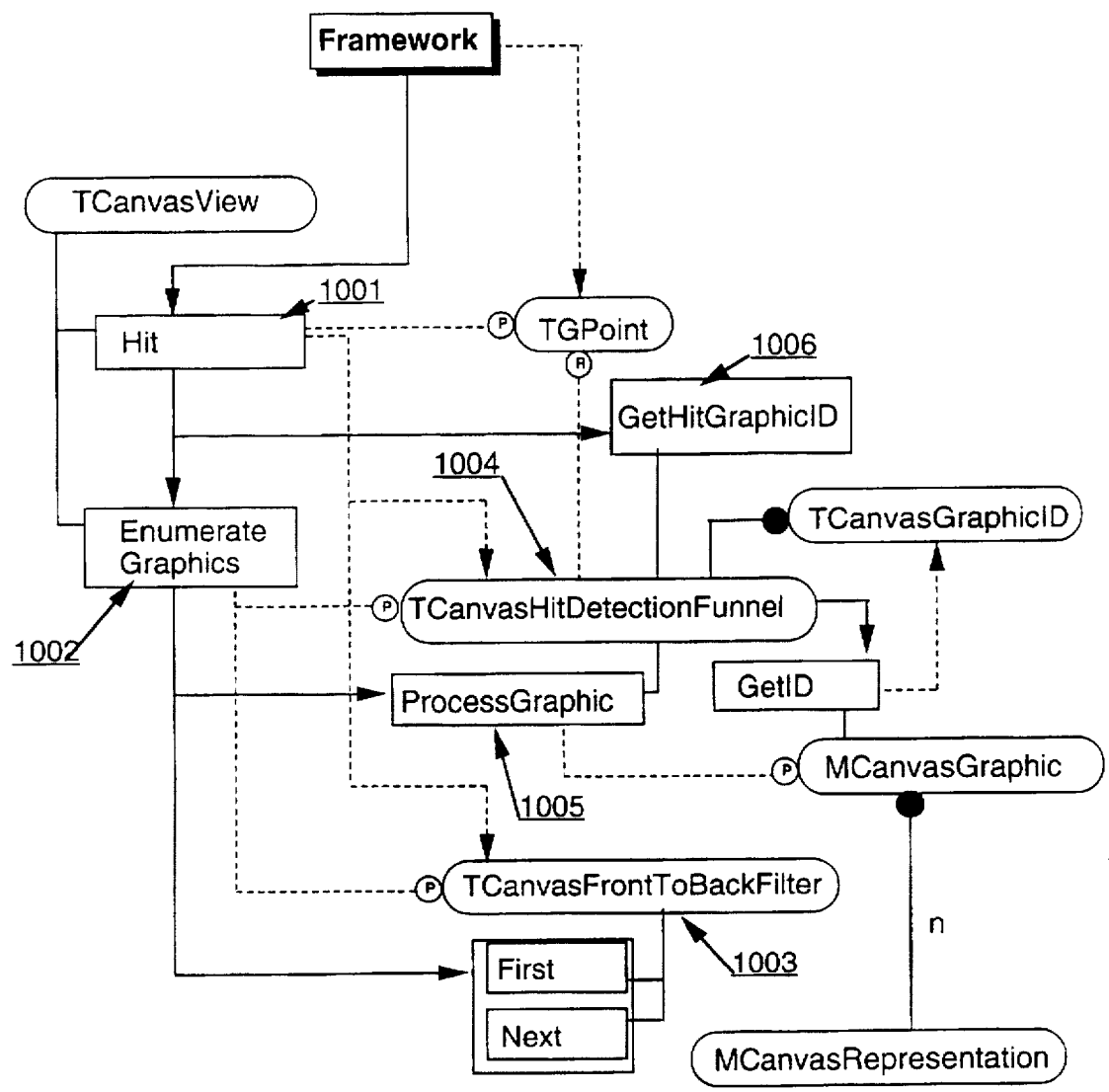
FIG. 10 is an object diagram illustrating the relationships between the classes, methods, and their interactions using the invention to perform hit detection.
Figure 11:
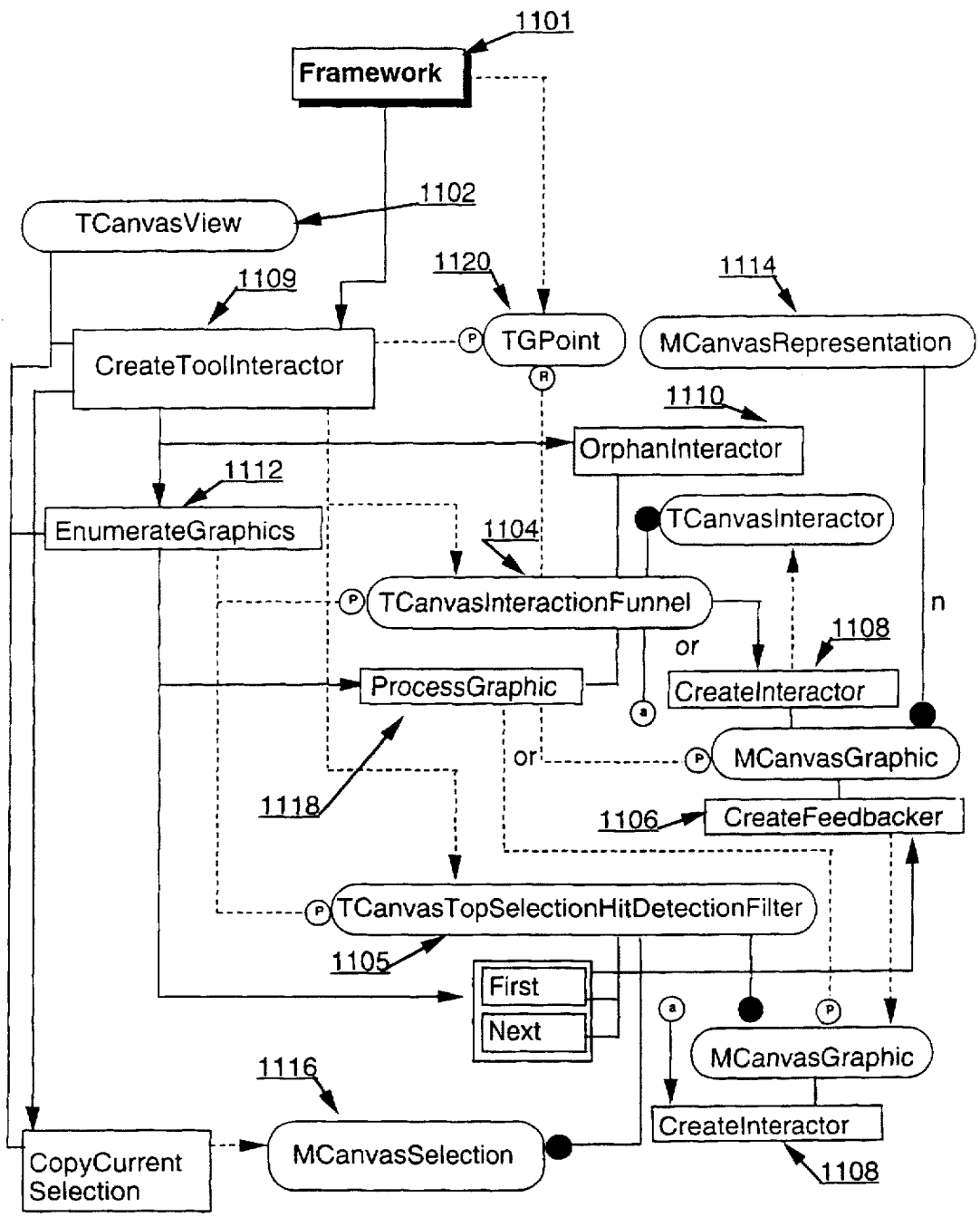
FIG. 11 is an object diagram illustrating the relationships between the classes, methods, and their interactions using the invention to support user interaction with graphics.

Hit detection determines which displayed graphic intersects the pointing device. Like the graphics drawing features of GrafEdit, hit detection also uses the invention. Hit detection is shown in FIG. 10. The TCanvasView::Hit method 1001 calls EnumerateGraphics 1002 with an appropriate filter and funnel. A hit occurs when the top-most graphic intersects a specified point (often the point is specified by the pointing device). Therefore the TCanvasFrontToBackFilter object 1003 selects canvas graphics from front to back in the canvas representation. The TCanvasFrontToBackFilter object 1003 does not use the "current selection". This is because hit detection is limited to canvas graphics stored in the canvas representation and does not need to consider selection feedbackers. (However, an application developer could change this operation by changing the filter.) The TCanvasHitDetectionFunnel object 1004 accepts each graphic passed to its ProcessGraphics method 1005. It then performs an intersection test to determine whether the specified point is within the graphic. If so, it remembers the graphic and returns FALSE from ProcessGraphic 1005. As mentioned above, TCanvasGraphicFunnel::ProcessGraphic returns TRUE to condition EnumerateGraphics 1002 (that calls it) to continue enumeration, or returns FALSE to condition EnumerateGraphics 1002 to terminate enumeration. Thus, if the purpose of the funnel is to look for a graphic that meets specified criteria, it can terminate enumeration (the process of iterating) once the graphic has been found. Once EnumerateGraphics 1002 returns to TCanvasView::Hit 1001, TCanvasView::Hit 1001 calls the funnel's GetHitGraphicID 1006 method to identify which canvas graphic was hit by the pointing device, if any.

Graphic Interaction

The invention can be used to implement user interaction with a graphic. The main difference between the graphic interaction embodiment and the previous embodiments is in the filter and funnel. Interaction begins when the cursor tools framework 1101 calls a TCanvasView 1102 method to create and return a tool interactor. An interactor is an object that supplies information used to control and/or handle interaction (e.g., such as what to do while the pointer device button is held down, what to do when the pointer device is incrementally moved, and what to do when the pointer device button is released). The tool interactor is started by, and becomes a standard part of, the cursor tools architecture. The tool interactor handles pointer events and executes commands against the tool handler to accomplish the interactor's purpose. Interactors are described in application Ser. No. 08/295,442 referenced above.

The invention is related to how the view creates the interactor. The canvas view's 1102 CreateToolInteractor method 1109 creates a filter 1105 and funnel 1104 and passes them to EnumerateGraphics 1112. The funnel 1104 is constructed from the point 1120 that was passed to CreateToolInteractor 1109 from the framework.

During enumeration, TCanvasTopSelectionHitDetectionFilter 1105 makes two passes over the canvas graphics in the canvas representation 1114. During the first pass the filter 1105 considers only selected canvas graphics (i.e., in a supplied canvas selection object 1116) enumerating from front-to-back. For each selected canvas graphic, the filter 1105 creates a corresponding selection feedbacker by calling the canvas graphic's CreateFeedbacker method 1106. The filter 1105 returns this selection feedbacker to EnumerateGraphics 1112. During the second pass the filter 1105 returns canvas graphics in the canvas representation 1114 from front-to-back. Both the selection feedbackers and the graphics from the canvas representation are canvas graphics. The funnel 1104 will process them the same.

Each canvas graphic and selection feedbacker furnished by the filter 1105 is passed to the funnel's ProcessGraphic method 1118. For each graphic passed to the funnel 1104, the funnel's ProcessGraphic method 1118 first performs hit detection to determine if the graphic is hit by the point 1120 that was passed into CreateToolInteractor 1109 (because the funnel 1104 was constructed by CreateToolInteractor 1109 and was passed a reference to the point 1120 at this time). If the point 1120 does not intersect the canvas graphic (e.g., there was not a hit), the funnel 1104 does nothing with the passed canvas graphic and simply returns TRUE to EnumerateGraphics 1112 to continue enumeration. However, if a hit is detected the funnel 1104 calls the hit graphic's CreateInteractor method 1108 passing the point 1120. The graphic can support multiple types of interactions, in which case the graphic determines which area of the graphic was intersected by the point 1120 and returns the appropriate interactor. Note that design allows interaction to be location dependent within the graphic. This allows graphics such as the SRT selection feedbacker to supply special interactors (to support Scale, Rotation, and Translate interactions) dependent on where the point 1120 intersects the selection graphic. If the graphic does not specify a special interactor at the given point 1120 the graphic returns NIL. The funnel 1104 retains the returned value for later use in the funnel's Orphaninteractor method 1110.

After EnumerateGraphics 1112 returns, CreateToolInteractor 1109 calls the funnel's Orphaninteractor method 1110 to extract the interactor retained by the funnel 1104 during enumeration. If OrphanInteractor 1110 returns NIL, CreateToolInteractor 1109 creates a default interactor. In either case the interactor (either the default or the one saved by the funnel 1104) is returned to the cursor tools framework 1101. The cursor tools framework 1101 starts the interactor to begin the embodied interaction.

While the invention has been described in terms of a series of preferred embodiments, those skilled in the art will recognize that the invention can be practiced, with modification, in other and different hardware and software environments within the spirit and scope of the appended claims.

Having thus described our invention, what we claim as new, and desire to secure by Letters Patent is:

1. A method for displaying an image composed of a plurality of canvas graphics, for use with a computer having a memory, a pointing device, an attached display, rendering program logic for rendering each of the plurality of canvas graphics on the display and iteration program logic for sequentially identifying each of the plurality of canvas graphics, the method comprising the steps of:

(a) creating in the memory a filter object having filter methods for using the iteration logic to sequentially generate references to selective ones of the plurality of canvas graphics in an order determined by data in the filter object;

(b) creating in the memory a funnel object having rendering methods for sequentially accepting references to canvas graphics and for using the rendering logic to render the referenced canvas graphics; and (c) executing in the memory, in response to a selection of the predetermined canvas graphic with the pointing device, an enumeration method for calling the filter methods and passing the generated references to the funnel object to display a composite image on the display.

2. The method of claim 1 wherein step (a) comprises the step of:

(a1) creating in memory a filter object which has methods that generate a reference to a selection feedbacker graphic which indicates selection of a predetermined canvas graphic within the sequence of canvas graphic references.

3. The method of claim 2 wherein step (a1) comprises the step of:

(a1a) creating in memory a filter object which has methods that generate a reference to a selection feedbacker graphic in place of a reference to the predetermined canvas graphic.

4. The method of claim 1 wherein step (c) comprises the steps of:

(c1) executing methods in the funnel object to process each of the generated references and return a status indication indicating processing results; and (c2) terminating the enumeration method execution responsive to a selected status indication.

5. The method of claim 1 wherein step (c) comprises the step of:

(c3) using the rendering program logic to render each of the canvas graphics on the display.

6. The method of claim 1 wherein step (c) comprises the step of:

(c4) executing a method in the funnel object which detects when a location on the display falls within one of the canvas graphics.

7. The method of claim 1 wherein step (c) comprises the step of:

(c5) executing a method in the funnel object to create an interactor object containing methods for receiving information from the pointing device and methods for controlling user interaction with a selected one of the canvas graphics.

8. The method of claim 1 wherein step (c) comprises the step of:

(c6) executing a method in the funnel object which uses the iteration logic to generate references to first selective ones of the plurality of canvas graphics during a first iteration; and (c7) executing a method in the funnel object which uses the iteration logic to generate references to second selective ones of the plurality of canvas graphics different from the first selective ones of the plurality of canvas graphics during a second iteration.

9. The method of claim 1 wherein step (a) comprises the steps of:
(a2) creating in memory a filter object which has methods that generates a reference to a selection feedbacker graphic which is not included within the plurality of canvas graphics.

10. The method of claim 1 wherein step (b) comprises the step of:
(b4) generate references to selective ones of the plurality of canvas graphics in response to data included in each of the plurality of canvas graphics.

11. The method of claim 1 wherein each of the plurality of canvas graphics comprises a canvas graphic object including graphical data which can be used by the rendering program logic for rendering an image of the canvas graphic on the display.

12. Apparatus for displaying an image composed of a plurality of canvas graphics contained within a canvas container, for use with a computer having a memory, a pointing device, an attached display, rendering program logic for rendering each of the plurality of canvas graphics on the display and iteration program logic for sequentially identifying each of the plurality of canvas graphics, the apparatus comprising:
(a) a filter constructor which creates in the memory a filter object having filter methods for using the iteration logic to generate references to selective ones of the plurality of canvas graphics in an order determined by data in the filter object;
(b) a funnel constructor which creates in the memory a funnel object having rendering methods for sequentially accepting references to canvas graphics and for using the rendering logic to render the referenced canvas graphics; and
(c) means responsive to a selection of the predetermined canvas graphic with the pointing device, for executing in the memory an enumeration method for calling the filter methods and passing the generated references to the funnel object to display a composite image on the display.

13. The apparatus of claim 12 wherein the filter object comprises methods that generate a reference to a selection feedbacker graphic which indicates selection of a predetermined canvas graphic within the sequence of canvas graphic references.

14. The apparatus of claim 13 wherein the filter object comprises methods that generate a reference to a selection feedbacker graphic in place of a reference to the predetermined canvas graphic.

15. The apparatus of claim 12 wherein the funnel object methods comprise a method for processing each of the generated references and returning a status indication indicating processing results and wherein the executing means comprises a method for terminating the enumeration method execution responsive to a selected status indication.

16. The apparatus of claim 12 wherein the funnel object methods comprise a method for using the rendering program logic to render each of the canvas graphics on the display.

17. The apparatus of claim 12 wherein the funnel object methods comprise a method for detecting when a location on the display falls within one of the canvas graphics.

18. The apparatus of claim 12 wherein the funnel object methods comprise a method for creating an interactor object containing methods for receiving information from the pointing device and for controlling user interaction with a selected one of the canvas graphics.

19. The apparatus of claim 12 wherein the filter object methods comprise a method for using the iteration logic to generate references to first selective ones of the plurality of canvas graphics during a first iteration and a method for using the iteration logic to generate references to second selective ones of the plurality of canvas graphics different from the first selective ones of the plurality of canvas graphics during a second iteration.

20. The apparatus of claim 12 wherein the filter object methods comprise a method for generating a reference to a selection feedbacker graphic which is not included within the plurality of canvas graphics in the canvas container.

21. The apparatus of claim 12 wherein the filter object methods comprise a method for generating references to selective ones of the plurality of canvas graphics from data included in each of the plurality of canvas graphics.

22. The apparatus of claim 12 wherein each of the plurality of canvas graphics comprises a canvas graphic object including graphical data which can be used by the rendering program logic for rendering an image of the canvas graphic on the display.

23. A computer program product for displaying an image composed of a plurality of canvas graphics, for use with a computer having a memory, a pointing device, an attached display, rendering program logic for rendering each of the plurality of canvas graphics on the display and iteration program logic for sequentially identifying each of the plurality of canvas graphics, the computer program product comprising a computer usable medium having computer readable program code thereon including:
(a) program code for creating in the memory a filter object having filter methods for using the iteration logic to generate references to selective ones of the plurality of canvas graphics in an order determined by data in the filter object;
(b) program code for creating in the memory a funnel object having rendering methods for accepting references to canvas graphics and for using the rendering logic to render the referenced canvas graphics; and
(c) enumeration method code which executes in the memory, in response to a selection of the predetermined canvas graphic with the pointing device, and calls the filter methods and passes the generated references to the funnel object to display a composite image.

24. The computer program product of claim 23 wherein the filter object comprises methods that generate a reference to a selection feedbacker graphic which indicates selection of a predetermined canvas graphic within the sequence of canvas graphic references.

25. The computer program product of claim 24 wherein the filter object comprises methods that generate a reference to a selection feedbacker graphic in place of a reference to the predetermined canvas graphic.

26. The computer program product of claim 23 wherein the methods in the funnel object process each of the generated references and return a status indication indicating processing results and the enumeration method code terminates execution in response to a selected status indication.

27. The computer program product of claim 23 wherein the methods in the funnel object use the rendering program logic to render each of the canvas graphics on the display.

28. The computer program product of claim 23 wherein the methods in the funnel object detect when a location on the display falls within one of the canvas graphics.

29. The computer program product of claim 23 wherein the methods in the funnel object create an interactor object containing methods for receiving information from the pointing device and for controlling user interaction with a selected one of the canvas graphics.

30. The computer program product of claim 23 wherein the methods in the filter object comprise methods for using the iteration logic to generate references to first selective ones of the plurality of canvas graphics during a first iteration and methods for using the iteration logic to generate references to second selective ones of the plurality of canvas graphics different from the first selective ones of the plurality of canvas graphics during a second iteration.

31. The computer program product of claim 23 wherein the methods in the filter object comprise methods for generating a reference to a selection feedbacker graphic which is not included within the plurality of canvas graphics.

32. The computer program product of claim 23 wherein the methods in the filter object comprise methods for generating references to selective ones of the plurality of canvas graphics in response to data included in each of the plurality of canvas graphics.

* * * * *